United States Patent
Liran

(10) Patent No.: US 6,204,572 B1
(45) Date of Patent: *Mar. 20, 2001

(54) POWER SUPPLY FOR PROVIDING INSTANTANEOUS ENERGY DURING ELECTRIC UTILITY OUTAGE

(75) Inventor: Abraham Liran, Tarzana, CA (US)

(73) Assignee: Perfect Power Inc., Commerce, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/271,895

(22) Filed: Mar. 18, 1999

(51) Int. Cl.$^7$ .................................................. H02J 7/00
(52) U.S. Cl. ............................................ 307/64; 318/150
(58) Field of Search ........................... 310/211; 307/64, 307/65, 67; 318/47, 150, 161, 716, 717, 718, 719

(56) References Cited

U.S. PATENT DOCUMENTS 5,734,217 * 3/1998 Morinigo ........................... 310/166
5,818,141 * 10/1998 Cho et al. .......................... 310/211
6,020,657 * 2/2000 Liran .................................. 307/64

* cited by examiner

Primary Examiner—Josie Ballato
Assistant Examiner—Robert L. Deberadinis

(57) ABSTRACT

A power supply system and method provides for smooth transitions between a utility power, transitory instantaneous power, and backup power in the event of a utility power failure of a utility supplying power to a load. As the utility power weakens due to a failure of the normal utility power supply, a synchronous machine becomes immediately a generator and supplies the required instantaneous power to the load. In order to maintain a constant speed on the synchronous machine, a high speed flywheel rotating faster than the synchronous machine provide kinetic energy that is magnetically coupled to the synchronous machine through an electromagnetic clutch to provide the synchronous machine with the required energy until the utility recovers from its failure. The magnetic clutch has induction bars for rotating with the flywheel and field coils rotating the synchronous machine for coupling kinetic energy from the flywheel to the synchronous machine during a utility power failure.

16 Claims, 2 Drawing Sheets

POWER SUPPLY FOR PROVIDING INSTANTANEOUS ENERGY DURING ELECTRIC UTILITY OUTAGE

REFERENCE TO RELATED APPLICATION

The present application is related to applicant's co-pending application entitled "Power Supply For Providing Instantaneous Energy During Electric Utility Outage", filed Aug. 27, 1997, Ser. No. 08/917,951 by the same inventor and assignee issuing on Feb. 1, 2000 into U.S. Pat. No. 6,020,657.

FIELD OF INVENTION

This invention relates to rotating electric machines for electric power generation. More specifically, the invention relates to synchronous motors and generators as well as means for providing or furnishing a substantially instantaneous energy supply to a sensitive load in case that the electric utility fails to provide energy to the load.

BACKGROUND OF THE INVENTION

Sensitive loads such as computers, data processing equipment and medical equipment must be protected from sudden changes of the line voltage and/or frequency. Such sensitive or critical loads also include hospitals, clinics, life support system, military installations, land, air and sea borne traffic control installations, remote systems such as those controlled by the armed forces, weather monitoring systems, critical manufacturing processes, nuclear facilities, large banking facilities, computer installations, large building elevators, emergency lighting and other loads where loss of power can be threatening to human life or property. It is desirable to limit undesirable electrical power instabilities coming from the electric utility lines by using backup power sources.

British patent 1,309,858 discloses an uninterrupted power supply for ensuring that uninterrupted power is supplied to a load. This supply provides partial compensation to a voltage drop by connecting an auxiliary power supply to the load via a secondary winding of a transformer, the primary winding of which is connected to a choke located between the main power supply and the supply. The use of a transformer disadvantageously makes the system expensive.

Many of the current uninterrupted power supplies may accomplish the required protection using a rotating flywheel disadvantageously having large weight. Depending upon rotating flywheel mass requirements, the flywheel may be a separate structure or incorporated into an arrangement of the a motor, shaft, or rotor. For sensitive or critical loads where even a small change in frequency can cause problems, flywheel size requirement may become impractical. The flywheel large spinning mass also creates problems in startup and performance when acceleration or deceleration of the spinning mass is required.

EP 69568 discloses an uninterrupted power supply using a high frequency method wherein a high frequency alternating current (AC) power generator drives a small, high speed motor and flywheel both located in a sealed chamber. This approach is relatively expensive due to the use of an additional high frequency generator. Maintaining electric power frequency and phase within tolerances for sensitive or critical loads has also been a problem. Apparatus, which modifies frequency and other complex devices, have been used.

U.S. Pat. Nos. 4,827,152, 5,311,062 and 5,434,454 disclose uninterrupted power supplies having high pressurized hydraulic systems. These systems are unreliable since the high pressure piping included in these systems can burst. Furthermore, these systems do not provide the required frequency needed for such systems due to the need to accelerate the hydraulic motor at the outage instant.

There exists a need for a simpler and more effective power backup system which can substantially instantaneously respond to utility failures of the line power without the disadvantages of heavy flywheels or high pressurized hydraulics, and frequent maintenance. These and other disadvantages are solved or reduce using the present invention.

SUMMARY OF THE INVENTION

An object of the invention is to provide substantially instantaneous power to a sensitive or critical load, in case that the electric utility fails to provide adequate power to the load.

Another object of the invention is to provide a power supply having rotating flywheel in a compact design for providing a substantially instantaneous energy to a synchronous machine then providing the instantaneous power to the load during utility power failures.

Another object of the invention is to provide a drive motor powered by utility power functioning as for driving a rotating flywheel rotating at a speed greater than a synchronous machine which also functions as a generator providing instantaneously power to the load by transferring kinetic energy from the high speed flywheel to the generator during utility power failures.

Another object of the invention is to provide a magnetic clutch for controlling the amount of instantaneously kinetic energy transfer from the rotating flywheel to the synchronous machine.

Another object of the invention is to provide smooth phase sync transitions when transiting between utility power from the utility during normal operation, instantaneous power from the machine during a transitory period of utility failure and backup power from a backup supply during an extended period of utility failure.

The present invention is a power supply and method for providing a substantially instantaneous power to a sensitive load in case that the electric utility fails to provide energy to a load during a power outage. The power supply comprises a drive motor driving a high RPM rotating flywheel when the utility supplies operating utility power to the load and drives a synchronous machine functioning as a generator providing a substantially instantaneous power to the load during transitory utility power outages. The synchronous machine is coupled through a rotating shaft and a magnetic clutch to the flywheel. The magnetic clutch includes an induction bars coupled to the flywheel and field coils coupled to the shaft. A sensing means is used to detect when the utility power to the load is interrupted. During utility power outages, the magnetic clutch control changes the magnetic coupling of the induction bars and field coils so as to transfer instantaneous energy from the rotating flywheel to the shaft and to the synchronous machine now functioning as a generator supplying instantaneous power to the load during the transitory utility power outages.

The magnetic clutch is preferably driven by a split core transformer having its core split into two parts, one for the primary windings and the other for the secondary windings of the split core transformer. The magnetic clutch has induction bars coupled to the flywheel and has the field coil coupled to the secondary of the a split core transformer. The primary winding is coupled to a magnetic clutch control means. A magnetic clutch control signal is transmitted to the field coil of the magnetic clutch from the secondary winding of the split core transformer for controlling the amount of kinetic transferred energy magnetically coupled from the flywheel to the synchronous machine. The magnetic clutch control is regulated to control the amount of magnetic flux in the primary winding to control the clutch control signal from the secondary winding to generate magnetic flux in the magnetic clutch to variably control the magnetic coupling between the induction bars and the field coils for variably controlling the amount of energy transfer from the flywheel to the synchronous machine. During electric utility outage failure, the electromagnetic clutch maintains a constant speed on the common shaft driving the synchronous machine which then supplies the instantaneous power to the load. In the preferred embodiment, the stator of the magnetic clutch having the field coils is turning with the shaft of the synchronous machine, and the induction bars are coupled to the magnetic clutch housing and to the flywheel. The primary winding of the transformer is attached to a stationary frame of the power supply and the secondary winding of the transformer is attached to the rotating stator of the magnetic clutch. The preferred electromagnetic clutch control is controlled by a clutch control means and a control unit that variably changes the voltage across the primary winding of the transformer for coupling a control signal to the secondary winding and then to the field coils as a regulated variable control signal, which in turn, controls the amount of magnetic flux in the field coils of magnetic clutch to provide the ability to increase or decrease the magnetic coupling between the induction bars and the field coils for providing controlled instantaneous energy transfer from flywheel to the shaft of the synchronous machine which then function as a generator providing instantaneous power to the load. As the to primary winding decreases, the secondary winding control signal decreases, decreasing the magnetic flux between the field coil and induction coil to decrease the amount of magnetic coupling between the field coil and the induction coil.

In one preferred form, the sensor means is an RPM sensor coupled to the rotating shaft to sense the RPM speed of the rotating shaft. In another preferred form, the sensor means is a frequency sensor sensing the frequency of the output voltage signal from the synchronous machine. The RPM speed of the rotating shaft, or the frequency of the output voltage signal instantaneously decreases upon the occurrence of a utility power failure. A control unit monitors the sensor and activates the magnetic clutch control during utility power failure. The magnetic clutch control in turn controls the magnetic clutch to transfer instantaneous energy to the synchronous machine which then supplies the instantaneous power to the load. The magnetic clutch variably transfers kinetic energy from the flywheel to drive the synchronous machine which then functions as a generator providing instantaneous power at the instant of an electric utility outage. When the utility power is restored after the limited transitory period of time, the phase of the instantaneous power from the machine is controlled to be in sync with utility power for a smooth transition from the instantaneous power to the restored utility power.

The power supply is preferably connected to a backup supply for supplying backup power to the load during extended periods of utility failure. The flywheel has a limited amount of kinetic energy available for transfer to the machine during a short limited transitory period of time. When the backup supply is operating at the required line voltage and frequency levels, the backup supply is controlled to be in phase sync with the machine so that backup power is switched on line through a smooth transition from instantaneous power to backup power. When the utility power is restored after an extended period of backup supply, the backup supply is controlled to be in phase sync with the utility power for a smooth transition between the backup power and the restored utility power.

In the preferred form, the power supply comprises a power supply assembly having a compact design. The assembly comprises a common shaft comprising a synchronous machine shaft coupled through the magnetic clutch to the flywheel. The synchronous machine shaft and the magnetic clutch shaft are aligned and supported by a frame. The flywheel rotates around the shaft using flywheel ball bearings, or other types of bearing such as roller bearings. The flywheel and attached induction bars rotate about the shaft at a higher speed than the shaft, and therefore higher than the synchronous machine rotating at a lower speed. The field coil and secondary windings of the transformer are rigidly attached to the shaft and rotate at the same low RPM speed of the shaft. The primary winding of the transformer and magnetic clutch control coils are rigidly attached to the frame. In the preferred assembly, a housing is supported on the frame, and has two apertures, through which the aligned shaft rotates, and between which is disposed a magnetic clutch arrangement having magnetic clutch field coils, magnetic clutch induction bars, primary windings of the spit transformer, secondary windings of the split transformer. The induction bars are driven by the single high speed flywheel, whereas the field coils are driven by the synchronous machine.

The method comprises the steps of rotating a flywheel by the drive motor at much higher speed than the speed of a synchronous machine functioning as a motor during normal utility power and function as a generator during utility power failure. The drive motor is driven by the utility power and in turn drives the flywheel during normal utility power. The method controls the electromagnetic clutch for controlling the transfer of energy from the high speed flywheel to the synchronous machine functioning as generator and supplying instantaneous power to a load during the transitory utility power outage. The method also further comprises the steps of sensing for utility power failure for then controlling the energy transfer of the magnetic clutch to transfer instantaneous energy from the flywheel to the synchronous machine. The method further comprises the steps of providing backup power during extended period of utility failures.

In the preferred form, the plurality of induction bars, such as twenty six bars are made of a magnetic conducting material, such as, low carbon steel, circumferentially aligned and radial extending from an inner diameter about the shaft of the magnetic clutch to an outer diameter, and are separate by an equal number of separation bars made of a nonmagnetic conducting material, such as aluminum, also circumferentially aligned and radial extending from the inner diameter about the shaft of the magnetic clutch to the outer diameter. The induction bars and separation bars are alternately arranged circumferentially and preferably bolted to a facing surface of the flywheel. The induction bars are used to transfer flywheel energy to the to synchronous machine by activating magnetic fields of the field coils controlled by the secondary of the spit core transformer controlling the amount of magnetic coupling.

The invention provide for a high speed flywheel and low speed synchronous machine for transferring kinetic energy from the flywheel to the machine which then provides the instantaneous power to a load during power outages by using a magnetic clutch. The magnetic clutch provides for the controlled transfer of energy from the flywheel to the machine and further provides for phase synchronization during transitions between utility power and instantaneous power. These and other advantages will become more apparent from the following detailed description of preferred embodiment.

DETAILED DESCRIPTION OF THE PREFERRED EMBODIMENT

Figure 1:
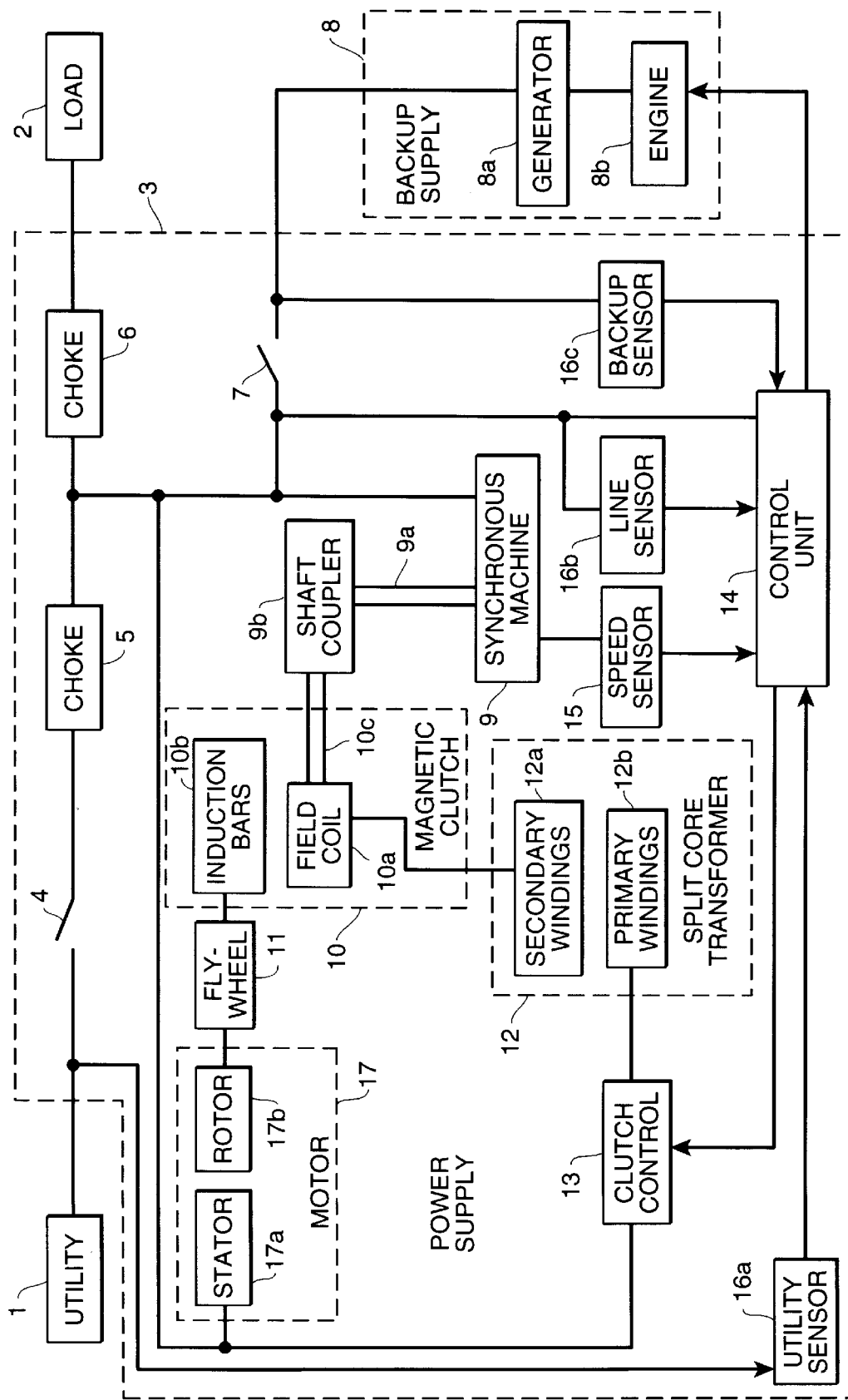
FIG. 1 is a block diagram of the power supply for delivering smooth uninterrupted power to a load during utility power failures.

A description of the invention is provided with reference to the figures using reference designations. Referring to FIG. 1, a utility 1 is connected to a load 2 through a power supply 3 comprising a utility switch 4 and chokes 5 and 6 through which utility power is delivered from the utility 1 to the load 2 when switch 4 is closed. The power supply 3 is preferably connected through a backup switch 7 to an optional preferred backup supply 8 having a generator 8a and an engine 8b for providing backup power to the load 2 during extended periods of utility power outage failures. The power supply 3 provides uninterrupted line power to the load 2. The synchronous machine 9 supplies the instantaneous power to load 2 during utility power failure for a limited transitory period of time.

The utility 1 provides utility power during normal operation when switch 4 is closed and switch 7 is opened. The synchronous machine 9 provides instantaneous power during the transitory utility failure when switches 4 and 7 are both opened. The backup supply 8 provides backup power during an extended utility failure when switch 4 is open and switch 7 is closed. The uninterrupted line power on the line between the chokes 5 and 6 is communicated to the load 2 and is either utility power from the utility, instantaneous power from the machine 9, or backup power from the backup supply 8.

The backup generator 8a is optionally preferably connected to the load 2 through the switch 7 for providing backup power to load 2 during extending periods of utility power failure. Backup power is delivered to the load 2 through the switch 7 when closed. Backup power is not delivered to the load 2 when switch 7 is opened. Switch 7 is opened during the delivery of utility power from the utility 1 to the load 2 during normal utility operation, or opened during the delivery of instantaneous power from the machine 9 to the load 2. After a utility failure, switch 7 remains opened during the delivery of instantaneous power from the synchronous machine 9 to the load 2 during short transitory periods of utility power failure. The backup supply 8 provides backup power to the load 2 and to the power supply 3 during extended periods utility failure when switch 7 is closed.

The synchronous machine 9 functions as a motor during normal utility operation and as a generator during transitory utility failure. The synchronous machine 9 functions as a generator to supply the instantaneous power to the load 2 when the utility 1 fails to provide power at normal operating power levels for the limited transitory period. The synchronous machine 9 functions as a motor during normal utility operation by receiving power from the utility 1 and driving a shaft 9a, a coupler 9b coupled a magnetic clutch coupler, which may be an AC motor 10, comprising field coils 10a, induction bars 10b, and a shaft 10c to which the shaft 9a and coupler 9b are rigidly coupled for synchronous rotation. The synchronous machine shaft 9a is connected preferably in alignment to and through the shaft coupler 9b to the magnetic clutch shaft 10c. The shaft coupler 9b rigidly couples the shafts 9a and 10c together so that the induction bars 10b of the magnetic clutch 10 and synchronous machine 9 synchronously rotate together but at different speeds. The induction bars 10b is preferably rigidly coupled to a flywheel 11 and rotate synchronously together. Hence, the machine 9, shaft 9a, coupler 9b, shaft 10c and field coils 10a are preferably rigidly coupled in alignment and rotate synchronously at one low speed, and the flywheel 11 and induction bars 10b are preferably rigidly coupled and rotate synchronously at another higher speed.

The high speed flywheel 11 is rigidly coupled to the induction bars 10b which is magnetically coupled to the field coils 10a of the magnetic clutch 10. A magnetic flux coupling exists between the coils 10a and bars 10b of the magnetic clutch 10. The field coils 10a and induction bars 10b couple electromagnetic energy between the coils 10a and bars 10b. The synchronous machine 9 is driven by the utility 1 using the utility power to rotate the machine 9 and the field coils 10a. A drive motor 17 has a stator 17a and rotor 17b and is driven by the utility power 1. The drive motor 17 rotates the flywheel 11 and the induction bars preferably attached to flywheel 11 to also rotate the induction bars 10b. The flywheel 11 and induction bars 10b are rotated at a high RPM speed greater than the a RPM speed of the synchronous machine 9, shafts 9a and 10c, coupler 9b and field coils 10a. During normal utility operation, the machine 9 and flywheel 11 rotate synchronously but at different RPM speeds.

The field coils 10a of the magnetic clutch 10 is also connected to an output magnetic clutch control signal of a transformer 12 having a primary winding 12b and a secondary winding 12a. The transformer 12 may be, for example, a split core transformer 12. The secondary winding 12a of the transformer 12 is connected to the field coils 10a of the magnetic clutch 10. The primary winding 12b is connected to a clutch control 13 for controlling the amount of magnetic coupling between coils 10a and bars 10b of the magnetic clutch 10. The magnetic clutch 10 and transformer 12 function together as an electromagnetic clutch means for controlling the amount of instantaneously energy transfer from the high speed flywheel 11 to the low speed synchronous machine 9.

A control unit 14 controls the operation of the power supply 3, including switches 4 and 7, backup supply 8 and the magnetic clutch control 13. The control unit 14 senses when there is a utility power failure. The control unit 14 is preferably connected to a speed sensor 15 for sensing preferably the frequency of the output voltage signal of the machine 9, or alternatively the rotational speed of the synchronous machine 9 for determining when there is a utility power failure by sensing a slow down of the rotational speed or output frequency of the synchronous machine 9. The speed sensors 15 senses the rotational speed or output frequency and senses the phase of the synchronous machine 9, and hence the output line voltage to the load 2. The speed sensor 15 may sense the rotational speed of the shafts 9a, coupler 9b or AC motor shaft 10c, or the output frequency. The control unit 14 may sense a utility power failure by sensing the utility power line into switch 4 using a utility sensor 16a, or may optionally sense the line voltage between chokes 6 and 5 using a line sensor 16b. When the control unit 14 senses a utility power failure, the control opens switch 4 to take the utility off line, and then controls the clutch control 13 to transfer kinetic energy from the flywheel 11 to the synchronous machine 9 then providing the instantaneous power to the load 2 during the transitory period.

The power supply 3, and particularly the control unit 14 receives power from the line voltage between the two chokes 6 and 5, but may receive power from the backup supply 8. The power supply 3 may optionally receive operation power directly from the utility 1 or power stored for example in batteries, not shown, for use during utility power failure. The control unit 14 can control the phase of the instantaneous power from the machine 9 and can control the phase of the backup power from the backup generator 8a, but can not control the phase of the utility power from the utility 1.

When not providing instantaneous energy during normal utility operation, the kinetic energy is transferred from the drive motor 17, to the flywheel and to the synchronous machine 9 through the shafts 10c and 9a to stabilize the machine 9 and flywheel at a low and a high rotational RPM speed, respectively. The magnetic clutch 10 is disabled during normal utility power 1, and hence, the flywheel 11 and synchronous machine 9 are separately driven by the normal utility power 1 to respective rotating speeds.

During normal operation, switch 4 is closed and 7 is open, and utility power is transmitted from utility 1 to load 2. The drive motor 17 turns the flywheel 11 in preferably the same direction as the shaft 10c but at a faster speed than the shaft 10c. When providing instantaneous energy during transitory utility failure, the high speed flywheel slows down and loses kinetic energy which is transferred through the coils 10a and bars 10b to the shafts 10c and 9a to the synchronous machine 9 which speeds up to maintain the synchronous machine 9 at its operating rotational speed so as to be able to supply the instantaneous power as a generator during transitory utility failure. The clutch control 13 variably changes the voltage to the primary winding 12b of the split core transformer 12 to variably drive the secondary winding 12a which provides the magnetic control signal to the field coils 10b to variably control the amount of magnetic coupling in the magnetic clutch 10, to variably control the amount of transferred kinetic energy from the flywheel to the synchronous machine 9 to maintain the instantaneous power at the required line power voltage and frequency levels.

It is desirably to ensure that the uninterrupted line power is supplied to the load 2 continuously with a minimal amount of distortion, when transiting between utility power, instantaneous power and backup power. The control unit 13 provides phase synchronization control for smooth transitions between utility power, instantaneous power and backup power. During the transition from utility power to instantaneous power, no synchronization is needed because the utility power and the instantaneous power are already in phase synchronization. During the transition from instantaneous power to utility power when utility power is restored at the end of the transitory period, the phase of the instantaneous power is synchronized to the utility power after the utility restores power. During the transition from instantaneous power to backup power at the end of the transitory period and before the extended period, the phase of backup power is preferably synchronized to the instantaneous power for smooth transitions, even though the instantaneous power could alternatively be controlled to be in phase sync with the backup power. During the transition from backup power to utility power at the end of the extended period, the control unit 14 synchronizes the phase of the backup power to the utility power just before the backup supply 8 is taken off line by opening switch 7 and the utility is put on line by closing switch 4. Alternatively, and during the transition from backup power to utility power at the end of the extended period when the instantaneous power from the machine 9 is in phase sync with the backup power from the backup supply 8, the control unit 14 could first take the backup supply 8 off line by opening switch 7, and regulating the power and phase of the machine 9 to provide instantaneous power, and then control the machine 9 to be in phase sync with the utility power 1 prior to connecting the utility 1 on line when closing switch 4.

Control unit 14 senses any change in utility power. The control unit 14 preferably senses the speed of the machine 9 through a speed sensor 15 for a slow down in speed indicating a utility power failure. The control unit 14 also preferably senses utility power through a utility sensor 16a, senses line power through a line sensor 16b and senses the backup power through a backup sensor 16c. The line power to the load 2 is the instantaneous power from the machine 9 when functioning as a generator. The line sensor 16b can sense the instantaneous power of the machine 9 during transitory utility power failure when a power failure or outage occurs. The control unit 14 senses the failure and simultaneously causes a disconnect of the utility 1 by opening switch 4 at which time the backup supply 8 is activated to generate the backup power. The control unit 14 maintain the frequency of the synchronous machine 9 functioning as a generator by using the clutch control 13 to control the amount of kinetic energy being transferred from the flywheel 11 through the magnetic clutch 10.

When utility power is restored by the utility 1 during the transitory period, the control unit 14 senses the utility power signal preferably using the utility sensor 16a, and senses the operation of the synchronous machine 9 using the speed sensor 15 and/or the line sensor 16b. The control unit 14 synchronizes the phase of the instantaneously power from the synchronous machine 9 with the phase of the utility power from the utility 1 by modifying the speed of the synchronous machine 9 through the controlled transfer of kinetic energy from the flywheel 11. At the instant when both frequencies and phase of the utility 1 and synchronous machine 9 are synchronized, switch 4 is closed, and the utility 1 then supplies utility power to the load 2 and preferably to the synchronous machine 9 and to the drive motor 17 which in turn drives the flywheel 11, both of which then operate at normal operating rotational speeds.

The power supply 3 implements a method for providing uninterrupted power to the load during a utility power failure. Initially, the utility 1 supplies utility power to the load 2 and utility power can be sensed by the control unit 14. A failure of the utility power can be sensed through either sensor 16a at all times, or through line sensor 16b when switch 4 is closed. Sensor 15 is used to sense a utility power failure when the machine 9 starts to slow down when the sensor 15 detects a slower speed of the machine 9. Switch 7 is normally opened during normal utility operation.

When the utility failure is initially sensed, a transitory utility failure exists. Upon the detection of the transitory failure, the control unit 14 closes switch 4 and controls the clutch control 13 to increase the voltage of the primary windings 12b the transformer 12 to increase the magnetic coupling between the coils 10b and 10c so as to magnetically couple kinetic energy from the flywheel 11 to the machine 9. The coupled kinetic energy from the flywheel 11 to the machine 9 causes the machine 9 to speed up and to function as a generator supplying the instantaneous power to the load 2. The flywheel 11 has a limited amount of kinetic energy, and hence, the machine 9 can only supply the instantaneous power to the load 2 at the proper operating line power levels for a limited transitory period of time. The flywheel 11 stores a limited amount of kinetic energy providing a limited amount of time for the machine 9 to supply instantaneous power in the absence of both the utility power and backup power during the transitory power failure period. During the transitory utility power failure, the magnetic clutch control 13 is operated to control the amount of coupling of instantaneous kinetic energy from the flywheel 11 to machine 9 then supplying instantaneous power to the load 2 until either the utility power is restored during the transitory period, or control unit 14 senses that backup supply 8 is providing backup power at the required line frequency and voltage operating levels.

After the initial utility failure is sensed, the control unit 14 activates the backup engine 8b to drive the generator 8a of the backup supply 8. After backup supply activation, the control unit 14 monitors the backup power through the backup sensor 16c during the transitory period to determine when the backup supply 8 has reached required operating frequency and voltage levels. After the initial utility failure is sensed, the control unit 14 also continuously monitors utility power through the utility sensor 16a to determine when the utility power has been restored.

If the utility power is quickly restored during the transitory period, then the control unit 14 controls and regulates the machine 9 to phase sync the instantaneous power from the machine 9 with the phase of the utility power by monitoring the speed sensor 15 and the utility sensor 16a and controlling the magnetic clutch control 13. When smoothly transiting from instantaneous power to utility power during the transitory period, the machine 9 is controlled to adjust the instantaneous power phase to the phase of the utility power. The power supply 3 does not include a means to control the phase of the utility power, but includes the magnetic clutch control 13 for controlling the phase of the instantaneous power from machine 9 to be in sync with the utility power. When the restored utility power is in phase sync when controlling the magnetic clutch control 13, switch 4 is then closed to connect the utility 1 back on line to supply utility power to the load 2 as well as driving the machine 9 in sync. After utility power restoration during the transitory period, the control unit 14 controls the backup supply 8 to stop running. Backup power is not used during the transitory period, and switch 7 remains opened.

When the backup supply 8 reaches the normal operating voltage and frequency of the required line power to the load 2, and, after the expiration of the transitory period without a utility power restoration, the control unit 14 then controls the backup supply to adjust the phase of the backup power from the backup supply 8 to be in phase sync with the instantaneous power from the machine 9. Alternatively, the magnetic clutch control 13 could be used to adjust the phase of the instantaneous power from the machine 9 to be in coincident phase sync with the phase of backup power of the backup supply 8, but this requires changing the phase of the instantaneous power to the load 2 which requires stabilized phase of the line power. At the beginning of the extended utility power failure, the backup power and the instantaneous power are in phase synchronization under magnetic clutch control. The control unit 14 can sense the instantaneous power frequency and phase from the machine 9 through either of the speed sensor 15 or line sensor 16b, and can sense the backup power of the backup supply 8 through the backup sensor 16c. When the phase of the machine 9 is coincident with, that is, in phase sync with the phase of the backup power from the backup supply 8, and when utility power has not been restored, the control unit 14 then controls switch 7 to close and remained closed during the extended period of utility power failure. The backup supply 9 supplies backup power to the load 2 during the extended period of utility failure. During the extended period of utility failure, the backup supply 9 also drives the machine 9 at the low speed and the flywheel at the high speed. The utility power 1 drives the drive motor 17 that rotates the flywheel 11 and the machine 9 during normal utility power delivery. The backup supply 8 drives the drive motor 17 that rotates the flywheel 11 and the machine 9 during backup power delivery. backup supply 8 continues to supply backup power to the load 2, to the machine 9, and to the drive motor 17 during the extended utility failure while the control unit 14 monitors the utility power through sensor 16a. The control unit 14 continues to monitor the utility power through the sensor 16a to determine when the utility power has been restored at the end of the extended utility failure period.

After the extended period of backup supply, and when the control unit 14 has sensed through sensor 16a that utility power has been restored, the control unit 14 monitors the frequency and phase of the utility power and backup power which is then the line power to the load 2. When the utility power is restored during the extended period with the backup generator 8a of the backup supply 8 supplying line power at the require frequency and voltage levels, then control unit 14 will control the backup supply 8 to be in phase synchronization with the utility power. The control unit 14 controls the backup supply 8 to adjust the phase of the backup power to be in sync with the utility power. The backup supply 8 may be a Detroit Diesel Engine 24V71TA having a Woodward governor part number 2301A and a Marathon Electric generator part number 5M4044. The control unit 14 controls the speed of the engine 8b to control the phase of the backup power from the generator 8a. When in phase sync, the utility 1 is put back on line by closing switch 4 and the backup supply 8 is taken off line by opening switch 7. The control unit 14 operates to close switch 4 and open switch 7 when transiting between backup power and utility power. Then the control unit 14 controls the backup supply 8 to stop running. When switch 4 closes and switch 7 opens, the utility then provides on line utility power to the load 2 while driving the machine 9, and while driving the drive motor 17 which in turn drives the flywheel 11 while the backup supply 8 is taken off line and stopped to return to the normal operating condition.

Figure 2:
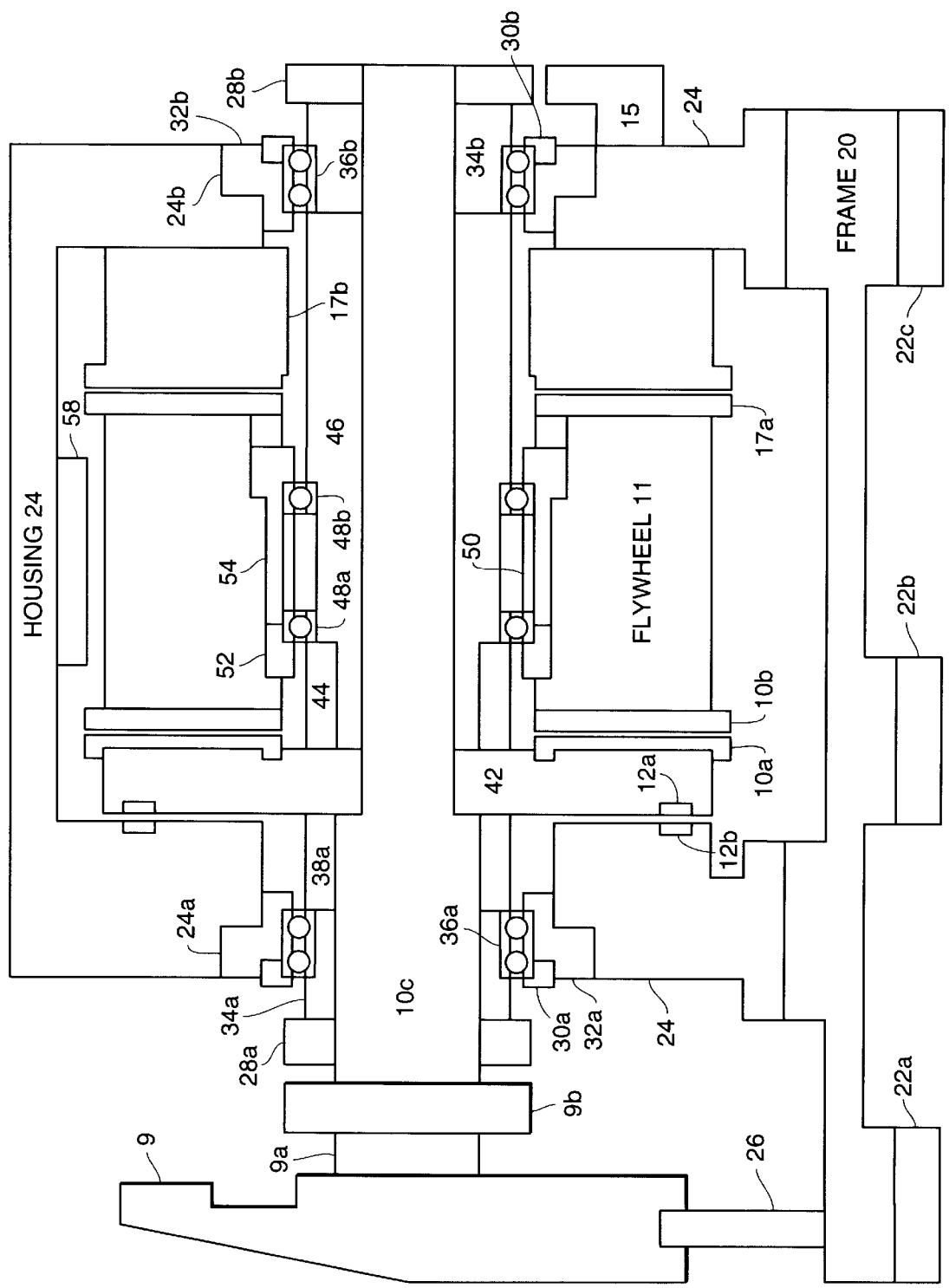
FIG. 2 is a mechanical drawing of power supply assembly of the power supply.

Referring to FIGS. 1 and 2, and more particularly to FIG. 2, a preferred power supply assembly is shown comprising the synchronous machine 9, shaft 9a, coupler 9b, magnetic clutch shaft 10c. The coupler 9b may be a Ringfeder part number XGS80-4. The synchronous machine 9 may be a Marathon Electric part number #B-SS527152 having an extended shaft 9a, but other type of motors and generators combinations could be used. The machine 9 preferably rotates at 1800 RPM and provides the instantaneous power during the transitory period which may be for example, limited to only ten seconds, depending on the amount of kinetic energy of the flywheel 11.

The shaft 10c has a cylindrical shape made out of steel or stainless steel. The flywheel 11 is preferably tubular in shape and disposed around the shaft 10c having a length of forty inches and a diameter of seven inches under the flywheel 11. The flywheel 11 can rotate at a high speed, e.g. 3600 rpm, weighting four tons, having an outer diameter of thirty nine inches and a width of twenty inches. The Flywheel 11 may be machined from cylindrical steel. The flywheel rotates relative to the shaft 10c and stores kinetic energy. The flywheel together with the induction bars 10b are coupled to the drive motor 17.

A frame 20 is a horizontal machined plate preferably made of steel 116.0 inches long and 61.0 inches wide weighing about one thousand pounds and having six shock absorbers only three of which 22a, 22b and 22c are shown from the side view. The shock absorbers 22 may be made of steel and rubber materials providing vibration isolation to the power supply assembly. An exemplar shock absorber is the LORD part number SMA095-1200-3 shock absorber. The frame 20 also supports a housing 24 having two circular apertures 24a and 24b through which the shaft 10c extends and is supported. The housing 24 can be bolted to the frame 20. The housing 24 can also be made of machined steel. The frame 20 also supports the synchronous machine 9 using a support 26. The shaft 10c is held in the housing 24 using ring clamps 28a and 28b. The clamps 28 position the shaft 10c axially within the housing 24. The clamps 28 may be machined parts having cylindrical shape, made of steel, and slotted through its center and by tightening the slotted section with screws, not shown, the clamps clamp to the machine shaft 10c.

The magnetic clutch 10 has a set of induction bars 10a that are circumferentially aligned, radial extending, and rigidly connected to a face of the flywheel 11 and are magnetic coupled to the field coils 10a. The induction bars preferably number twenty six bars and are made of magnetic conducting low carbon steel and are circumferentially aligned and radial extending from an inner diameter about the shaft 10c extending through the flywheel to an outer diameter, and are alternately separated by twenty six separation bars made of a nonmagnetic conducting aluminum, also circumferentially aligned and radial extending from the inner diameter about the flywheel shaft 10c of the magnetic clutch 10 to the outer diameter. The induction bars 10b and separate bars, not shown, are alternately arranged circumferentially and preferably bolted to a facing surface of the flywheel. The induction bars 10b are used to transfer flywheel energy to the to synchronous machine 9 by activating magnetic fields of the field coils 10b controlled by the secondary winding 12a of the spit core transformer 12 controlling the amount of magnetic coupling. The transformer 12 is preferably a split core transformer having a set of primary windings 12b and a respective set of secondary windings 12a. The windings 12a and 12b, field coils 10a and the flywheel 11 are circular ring structures radially surrounding the shaft 10c as shown, and encapsulated within the housing 24.

The field coils 10a are preferably on the stator of the magnetic clutch 10 and are electrically connected to the secondary windings 12a of the transformer 12. The filed coils 10a are wound copper wire coils of 130 turns conducting sixty amps each inserted in radial grooves slotted in the field coil cores 42. A clutch control voltage signal from the secondary windings 12a to the field coils 10a is used to control the magnetic coupling between the field coils 10a and the induction bars 10b. The induction bars 10b are preferably a plurality of equiangularly displaced radially extending alternating steel and aluminum bars, similar to spoked wheels. The bars 10b are bolted to the end face of the flywheel 11.

The secondary windings 12a rotate about the shaft 10c respectively using rings 30a and 30b, 32a and 32b, 34a and 34b, ball bearings 36a and 36b and rings 38a and 38b.

Bearings 36ab are preferably double ring bearings, as shown. The rings 30, 32, 34 and 38 are machined from steel. Rings 30, 32, 34 and 38 are used to position the double ring bearings 36 to avoid any axial movement relative to the axis of the shaft 10c. The bearings 36ab may be purchased parts. Signal and double bearings, cylindrical bearings, spherical bearings, taper roller bearings, or many type of bearing arrangements can be used. An exemplar bearing 36 is the SKF bearing 7226BCB.

The housing 24 is rigidly connected to the stator 17b for supporting the motor 17 and supporting the stationary primary windings 12b and functions as a core for the primary winding. The secondary windings 12a have a secondary core 42. Field coils 10a are disposed in the core 42a, as shown. The primary windings 12b are a single winding of wound copper wire of 118 turns conducting about 200 amps for one phase of the required line power. The voltage to the primary windings 12b is normally the utility line power 1. The secondary windings 12a have preferably one wound copper wire coils of 118 turns conducting about 180 amps for one phase of the required utility line power 1. The transformer secondary windings 12a is inserted into circular grooves slotted in the core 42 and is positioned opposite the primary windings 12b, as shown.

The field core 42 is a machined part made out of steel and have flat cylindrical faces. On one cylindrical face are radial slots for the field coils 10a and on the other face is a circular slot for the secondary windings 12a. The field coil core 42 is rigidly attached to the shaft 10c. The shaft 10c transfers rotational energy between the synchronous machine 9 and the cores 42 of field coils 10a.

The flywheel 11 and induction bars 10b also rotate about the shaft 10c using rings 44, 46, ball bearings 48a and 48b, a circular spacer 50, and rings 52a, 52b and 54. The bearings 36 and 38 support the shaft 10c in the housing aperture 24ab. The spacer 50 is a machine part made of steel having an outer diameter of about nine inches. The rings 44, 46, 52 and 54 are made of machine steel and position the bearings 48 and flywheel on the shaft 10c. Bearings 48 are preferably single ring bearings, as shown. The assembly preferably include an optional levitation coil 58 for centering the flywheel about the shaft 10c. The levitation coil 58 can be bolted to and supported by the housing 24 above the flywheel 11, as shown. The levitation coil 58 is an electromagnetic coil made from wound copper wire and attached to the housing 24 above the flywheel 11. When energized by the control unit 14, an electromagnetic force from the coil 58 pulls the flywheel 11 towards the housing 24 and reduces the weight on the bearings 48 and 36. The coil 58 of 1200 turns conducting five amps can be driven by steady AC voltage or DC current. The control unit 14 provides the necessary power to the coils 13 from line power.

The control unit 14 controls the clutch control 13 by providing a control voltage signals to the clutch control 13 which in turns provides a control voltage signal across the primary windings 12b. The control voltage signal to the primary windings is proportional to the amount of kinetic energy needed to be transfer to the synchronous machine to maintain the synchronous machine 9 at the proper speed and output voltage frequency during a power failure as part of a feed back control loop. The clutch control 13 control the voltage transfer through the primary windings 12b to the secondary windings 12a to provide the require amount of magnetic coupling of the magnetic clutch 10.

The concentric rings 34, 38, 44, 46, 52 and 54, and cores 42 are held is fixed longitudinal position along the shaft 10c by clamps 28. The rings 34, 38, 44, 46, 52 and 54, and cores 42 of the assembly are preferably fastened together using screws, not shown. Cores 42 and coil 58 are fastened to the housing 24. The assembly also includes seals, not shown. Those skilled in the art are familiar with conventional rotating motor fastening, lubricating and sealing means and techniques. The shape of the rings 34, 38, 42, 44, 46, 52 and 54, as well as the shaft 10c, enable the practical assembly and compact fixed relative positioning of the flywheel 11, field coils 10a, windings 12a and ball bearings 36 and 48.

A first gap is defined by the ball bearings 36ab between rings 34ab and 38ab buttressing the shaft 10c, and the rings 30, 32 and 40 supporting the primary windings stationary relative to the housing 24. The first gap respectively extends between the ring 40a and 40b and rings 42a and 42b, for magnetic coupling between stationary primary windings 12b, and the rotating secondary windings 12a. Clamps 28ab, rings 34ab, 38ab, 42ab, 44, 46, windings 12a and 12c, coils 10a and 10e all fit rigidly together and around the shaft 10c and rotate at a low RPM speed with the shaft 10c relative to the housing 24. Flywheel 11, induction bars 10b, rings 52ab and 54 also all fit rigidly together and rotate at a high RPM speed relative to the housing 24.

A second gap is defined by the ball bearings 48ab between rings 44 and 46 buttressing the shaft 10c, and rings 52ab and 54 supporting the flywheel 11 and induction bars 10b. The second gap respectively extends between the induction bars 10b and the field coils 10a. As may now be apparent, the flywheel 11 and induction coils 10b can rotate about the shaft 10c at an RPM speed different from RPM speed of the shaft 10c and the rigidly connected secondary windings 12a and field coils 10a in ring 42a and 42b respectively.

The power supply assembly also includes a sensor 15 for sensing the rotational speed of the shaft 10c, and hence the rotational speed of the synchronous machine 6, and hence the phase and frequency of the instantaneous power. The sensor 15 could be a magnetic, optical or like sensing means for measuring the rotation speed of the synchronous machine 6 having the shaft 9a coupled to shaft 10c to which is proximally located the sensor 15. The sensor 15 can be an optical sensor sensing printed markings, for example, white paint markings on the clamp 28b. The sensor 15 would have a LED, not shown, illumination white marking and reflective light back to a photodetector, not shown, of the sensor 15. When the white marking on the clamp 28b is rotated into position of the LED and photodetector, a pulse is generated by the sensor 15. The time between pulses is one rotation of the shaft 10c. Both phase and rotational speed can be determined by the control unit 14 using the senor 15. An exemplar photodetector sensor 15 is a McMaster part number 7011K32 sensor. Alternative sensors 15 could include a magnetic sensor having a magnet, not shown, around the core of the coil of the magnetic sensor. A ring, not shown, of magnetic material may be preferably disposed in the clamp 28b including a ferrous magnetic segment in the ring which induces electromagnetic pulses in the coil from which phase and speed can be determined and translated into electrical phase of frequency. Exemplary induction sensor is the McMaster part number 18705T51. A proximity sensor could be used to sense the rotational speed of the shaft 10c. An exemplar proximity sensor is the McMaster part number 7674K68 sensor. Another way to measure the rotational speed of the synchronous machine is using a frequency detector, for example a M100-F1 frequency detector made by MultiTech.

The line power supplies power to the clutch control 13 and control unit 14. During the transitory period, the synchronous machine 9 supplies the instantaneous power that is the line power to the load 2, and but also powers the power supply 3 including the control unit 14 and the clutch control 13. Because of the limited amount of kinetic energy in the flywheel 11, the power requirements of the load 2 and the power supply 3, the transitory period has a time limit beyond which the power supply 3 will be unable to supply the required line power, and hence the need for the optional backup supply 8 during extended utility failures.

The present invention covers a magnetic clutch 10 for transferring kinetic energy from a high speed flywheel 11 to a low speed synchronous machine 9 during period of utility power failure. The synchronous machine 9 functions as a motor to maintain the speed the flywheel 11 and is driven by the utility power during normal utility operation. The synchronous machine 9 functions as a generator to provide instantaneous power during utility failure by receiving instantaneous energy from the flywheel 11 through the magnetic clutch 10. The magnetic clutch 10 preferably comprises induction bars 10b connected to the flywheel 11 and comprises a field coil 12b connected to the synchronous machine 9 and the split core transformer 12. Preferably, the clutch control 13 alters the voltage in the transformer 12 to vary the amount of magnetic coupling through the magnetic clutch 10.

The preferred power supply 3 comprises a power supply assembly having primary windings 12b and seconding windings 12a of the transformer 12 and induction bars 10b and field coils 10a and the flywheel 11 coupled to the induction bars 10b.

The invention can be modified and improved. For example, the machine 9 could be connected through an over running to clutch to engine 8b so that the generator 8a is no longer necessary and the machine 9 provide backup power during the extended utility failure period. The preferred embodiment can be improved and enhanced, however, those improvements may none the less fall within the spirit and scope of the following claims.

What is claimed is:

1. A method for providing instantaneous power to a load during a power failure of a utility normally providing utility power to the load in the absence of the power failure, the method comprising the steps of, rotating a flywheel at a high speed to provide kinetic energy, rotating a synchronous machine at a low speed, magnetic coupling the flywheel to the synchronous machine through induction bars attached to and rotating with the flywheel and through field coils coupled to and rotating with the synchronous machine, detecting the power failure, disconnecting the utility power form the load, and controlling the magnetic coupling to control an amount of the kinetic energy transferred from the flywheel to the synchronous machine providing instantaneous power to the load, the controlling step controls the amount of the kinetic energy transferred from the flywheel to the synchronous machine by controlling the amount magnetic coupling between the induction bars and the field coils.

2. The method of claim 1 further comprising the step of supplying power from the utility to the synchronous machine for rotating the synchronous machine at the low speed and to a drive motor for rotating the flywheel at the high speed.

3. The method of claim 1 wherein, further comprising the step of levitating the flywheel to reduce friction when rotating at the high speed.

4. The method of claim 1 wherein,
the controlling step couples a magnetic clutch signal to the field coils to control the amount of magnetic coupling.

5. The method of claim 1, wherein the instantaneous power from the synchronous machine has an instantaneous phase, and the utility power from the utility has a utility phase when the utility is providing utility power, the method the further comprises the steps of,
sensing the instantaneous phase,
sensing the utility power phase,
controlling the magnetic coupling between the flywheel and the synchronous machine to synchronize the instantaneous phase with the utility power phase, and
reconnecting the utility power to the load when the utility is providing the utility power and when instantaneous phase is synchronized with the utility power phase.

6. The method of claim 5 further comprising the steps of
supplying backup power to the load during utility failure, and
sensing and controlling a backup phase of the backup power,
connecting the backup supply to the load for providing backup power to the load when the instantaneous phase is in sync with the backup phase and for driving the machine when the utility is disconnected from the load, and
disconnecting the backup power from the load when backup phase is in sync with the utility phase and connecting the utility power to the load.

7. A power supply system for providing instantaneous power to a load during a power failure of a utility normally providing utility power to the load in the absence of the power failure, the system comprising,
a flywheel rotated at a high speed to provide kinetic energy,
a synchronous machine rotating at a low speed,
magnetic coupling means for magnetically coupling the flywheel to the synchronous machine, the magnetic coupling means comprises induction bars coupled to and rotating with the flywheel and comprises field coils coupled to and rotating with the synchronous machine,
sensor means for detecting the power failure,
disconnecting means for disconnecting the utility power form the load, and
control means for controlling the magnetic coupling means to control an amount of the kinetic energy transferred energy from the flywheel to the synchronous machine providing instantaneous power to the load, the control means controls the amount of the kinetic energy transferred from the flywheel to the synchronous machine by controlling the amount magnetic coupling between the induction bars and the field coils.

8. The system of claim 7 is further for supplying power from the utility to the synchronous machine for rotating the synchronous machine at the low speed and to a drive motor, for rotating the flywheel at the high speed.

9. The system of claim 7 further comprising,
a levitation coil for levitating the flywheel to reduce friction when rotating at the high speed.

10. The system of claim 7 wherein,
the control means is for providing a control signal to the field coils to control the amount of magnetic coupling.

11. The system of claim 7, wherein the instantaneous power from the synchronous machine has an instantaneous phase, and the utility power from the utility has a utility phase when the utility is providing utility power, the system further comprises,
sensing means for sensing the instantaneous phase,
sensing means for sensing the utility power phase, the control means controls the magnetic coupling means between the flywheel and the synchronous machine to synchronize the instantaneous phase with the utility power phase, and the disconnecting means is for reconnecting the utility power to the load when the utility is providing the utility power and when instantaneous phase is synchronized with the utility power phase.

12. The system of claim 11, further comprising
backup supply for providing backup power to the load during utility failure, and
sensing means for sensing a power phase of the backup power,
connecting means for connecting the backup supply to the load to provide backup power to load and for driving the machine when the utility is disconnected from the load, and for disconnecting the backup supply from the load when connecting utility to the load, the control means controls the backup supply to synchronize the backup phase with the utility phase when disconnecting the backup power to the load and connecting the utility power to the load.

13. A power supply assembly controlled by a control unit for connecting instantaneous power to a load during a power failure of a utility normally providing utility power to the load in the absence of the power failure, the assembly comprising,
a tubular flywheel rotated at a high speed to provide kinetic energy,
a magnetic clutch comprising induction bars rigidly attached to the flywheel and field coils the field coils and induction bars are magnetically coupled over a gap extending between the field coils and the induction bars,
a split core transformer comprising primary windings and secondary windings coupled to the field coils for controlling the amount of magnetic coupling between the induction bars and the field coils, the secondary windings and field coils are rigidly attached to the shaft and rotate with the shaft,
a synchronous machine connected to the utility and coupled to the shaft when the synchronous machine functions as a motor for driving the shaft to rotate the synchronous machine at a low speed, the synchronous machine is disconnected from the utility when the providing the instantaneous power to the load during the utility failure,
a drive motor for rotating the flywheel at the high speed,
a clutch control means for providing a variable voltage control signal to the primary windings during the utility failure for generating magnetic flux into the field coils for controlling the amount of magnetic coupling between the flywheel and the synchronous machine,
a frame for supporting the synchronous machine in coupled alignment with the shaft,
a housing supported by frame and for encapsulating the flywheel and comprising two apertures through which extends the shaft and between which are disposed, in order along the shaft, the primary windings, secondary windings, the field coils, the induction bars, the flywheel, and the drive motor, a first set of ball bearing means disposed the between shaft and the housing for rotating the shaft, the secondary windings and the field coils relative to the housing at the low speed, and a second set of ball bearings disposed between the flywheel and the shaft for rotating the flywheel at the high speed relative to the housing.

14. The assembly of claim 13 wherein the control unit reconnects the utility to the load when the utility recovers from the power failure, the assembly further comprises, a sensor means for detecting a phase of the instantaneous power from the synchronous machine, the control unit can control clutch coils to control the amount of magnetically coupling between the flywheel to the synchronous machine to synchronize the phase of the instantaneous power with a phase of the utility power.

15. The assembly of claim 13 wherein the primary windings are stationary and rigidly coupled to the housing, and the secondary winding are rotating and rigidly coupled to the shaft.

16. The assembly of claim 13 further comprising, a levitation coil for levitating the flywheel to reduce friction when the flywheel is rotating at the high speed.

* * * * *